United States Patent
Ikku et al.

(10) Patent No.: US 12,533,830 B2
(45) Date of Patent: Jan. 27, 2026

(54) SUBSTRATE MANUFACTURING METHOD

(71) Applicant: DISCO CORPORATION, Tokyo (JP)

(72) Inventors: Yuki Ikku, Tokyo (JP); Hayato Iga, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 391 days.

(21) Appl. No.: 18/149,234

(22) Filed: Jan. 3, 2023

(65) Prior Publication Data

US 2023/0219256 A1 Jul. 13, 2023

(30) Foreign Application Priority Data

Jan. 13, 2022 (JP) ................. 2022-003451

(51) Int. Cl.
*B28D 5/00* (2006.01)
*B23K 26/06* (2014.01)
*B23K 26/50* (2014.01)

(52) U.S. Cl.
CPC ........ *B28D 5/0011* (2013.01); *B23K 26/0648* (2013.01); *B23K 26/0665* (2013.01); *B23K 26/50* (2015.10); *B28D 5/0094* (2013.01)

(58) Field of Classification Search
CPC ... Y10T 225/12; B28D 5/0011; B28D 5/0094; B28D 5/0041; B23K 26/50; B23K 26/0648; B23K 26/0665; B23K 26/067; B23K 26/073; B23K 26/53; B23K 26/55; B23K 26/57
See application file for complete search history.

(56) References Cited

U.S. PATENT DOCUMENTS

| | | | |
|---|---|---|---|
| 2005/0000649 A1* | 1/2005 | Rayssac | B28D 5/0064 156/717 |
| 2012/0061356 A1* | 3/2012 | Fukumitsu | B23K 26/0604 219/121.61 |
| 2014/0251963 A1* | 9/2014 | Kawaguchi | B23K 26/53 219/121.73 |
| 2015/0217400 A1* | 8/2015 | Yamada | B23K 26/53 225/2 |
| 2017/0301549 A1* | 10/2017 | Suzuki | B24B 37/107 |
| 2019/0164833 A1* | 5/2019 | Kirihara | H01L 22/12 |

(Continued)

FOREIGN PATENT DOCUMENTS

| | | |
|---|---|---|
| JP | 1997262826 A | 10/1997 |
| JP | 2013141701 A | 7/2013 |

(Continued)

OTHER PUBLICATIONS

Japanese Patent Application No. 2022-003451 : English translation of Office Action, Sep. 24, 2025 (3 pages).

*Primary Examiner* — Phong H Nguyen
(74) *Attorney, Agent, or Firm* — Greer, Burns & Crain, Ltd

(57) ABSTRACT

A peeling layer is formed in a workpiece in a state in which a laser beam is condensed so as to have a larger length along an indexing feed direction than a length along a processing feed direction. In this case, cracks included in the peeling layer extend along the indexing feed direction easily. It is consequently possible to increase a relative moving distance (index) between a place where the laser beam is condensed and the workpiece in an indexing feed step. As a result, it is possible to improve the throughput of a substrate manufacturing method using the laser beam.

16 Claims, 10 Drawing Sheets

(56) References Cited

U.S. PATENT DOCUMENTS

| | | |
|---|---|---|
| 2019/0337100 A1 | 11/2019 | Richter et al. |
| 2021/0202431 A1* | 7/2021 | Kobayashi ........... B23K 26/037 |
| 2023/0086426 A1 | 3/2023 | Korematsu et al. |

FOREIGN PATENT DOCUMENTS

| | | |
|---|---|---|
| JP | 2016111143 A | 6/2016 |
| JP | 2019140411 A | 8/2019 |
| JP | 202015091 A | 1/2020 |
| JP | 2021015987 A | 2/2021 |
| JP | 2021118288 A | 8/2021 |
| JP | 2021122040 A | 8/2021 |

* cited by examiner

SUBSTRATE MANUFACTURING METHOD

BACKGROUND OF THE INVENTION

Field of the Invention

The present invention relates to a substrate manufacturing method for manufacturing a substrate from a workpiece having a first surface and a second surface on an opposite side from the first surface.

Description of the Related Art

Chips of semiconductor devices are generally manufactured from a cylindrical substrate formed of a semiconductor material such as silicon (Si) or silicon carbide (SiC). The substrate is, for example, cut out from an ingot formed of a cylindrical semiconductor material by use of a wire saw (see Japanese Patent Laid-Open No. H09-262826, for example).

However, a cutting margin at a time of cutting out the substrate from the ingot by use of the wire saw is approximately 300 μm, and is thus relatively large. In addition, minute unevenness is formed on the top surface of the substrate cut out in this manner, and the substrate is curved as a whole (a warp occurs in a wafer). Therefore, the top surface of the substrate needs to be planarized by subjecting the top surface to lapping, etching, and/or polishing.

In this case, an amount of raw material ultimately used as substrates is substantially ⅔ of an amount of raw material of the whole ingot. That is, substantially ⅓ of the amount of raw material of the whole ingot is discarded at times of cutting out the substrates from the ingot and planarizing the substrates. Productivity is therefore decreased when the substrates are manufactured by use of the wire saw in this manner.

In view of this point, the manufacturing of the substrates from the ingot by use of a laser beam having a wavelength transmitted through the material constituting the ingot has been proposed (see Japanese Patent Laid-Open No. 2016-111143, for example). This method first repeats relative movement of the ingot and the condensing point of the laser beam along a processing feed direction in a state in which the condensing point is positioned in the ingot.

Consequently, a peeling layer including a modified portion formed around the condensing point of the laser beam and cracks extending from the modified portion is formed in each of a plurality of regions along the processing feed direction of the ingot. Then, a substrate is separated from the ingot with the peeling layer as a starting point by applying an external force to the ingot.

SUMMARY OF THE INVENTION

In the case of manufacturing substrates by use of the laser beam, the amount of raw material discarded can be reduced as compared with the case of manufacturing the substrates by use of the wire saw. That is, in the former case, productivity of the substrates can be improved as compared with the latter case.

On the other hand, while it is impossible or difficult in the former case to manufacture a plurality of substrates from the ingot at the same time, it is possible in the latter case to manufacture a plurality of substrates at the same time by making a plurality of wire saws cut into the ingot at the same time. Therefore, in the former case, throughput is often decreased as compared with the latter case.

In view of this point, it is an object of the present invention to improve the throughput of a substrate manufacturing method using a laser beam.

In accordance with an aspect of the present invention, there is provided a substrate manufacturing method for manufacturing a substrate from a workpiece having a first surface and a second surface on an opposite side from the first surface, the substrate manufacturing method including a peeling layer forming step of forming a peeling layer by moving a place where a laser beam having a wavelength transmitted through a material constituting the workpiece is condensed and the workpiece relative to each other along a processing feed direction parallel with the first surface in a state in which the laser beam is condensed in the workpiece, an indexing feed step of moving the place where the laser beam is condensed and the workpiece relative to each other along an indexing feed direction orthogonal to the processing feed direction and parallel with the first surface, and a separating step of separating the substrate from the workpiece with the peeling layer as a starting point after repeating the peeling layer forming step and the indexing feed step alternately. In the peeling layer forming step, the laser beam is condensed so as to have a larger length along the indexing feed direction than a length along the processing feed direction.

Further, preferably, in the peeling layer forming step, the workpiece is irradiated with the laser beam having a wave front controlled by a spatial light modulator, light rays located on a central side in a direction corresponding to the indexing feed direction in light rays constituting the laser beam entering the spatial light modulator are condensed to both end sides in the indexing feed direction of the place, and light rays located on both end sides in the direction corresponding to the indexing feed direction in the light rays constituting the laser beam entering the spatial light modulator are condensed to a central side in the indexing feed direction of the place.

In addition, preferably, the laser beam is branched so as to be condensed at each of a plurality of places separated from each other in the indexing feed direction.

In the present invention, the peeling layer is formed in the workpiece in a state in which the laser beam is condensed so as to have a larger length along the indexing feed direction included in the workpiece than a length along the processing feed direction. In this case, cracks included in the peeling layer extend along the indexing feed direction easily.

It is consequently possible to increase a relative moving distance (index) between the place where the laser beam is condensed and the workpiece in the indexing feed step. As a result, it is possible to improve the throughput of the substrate manufacturing method using the laser beam.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
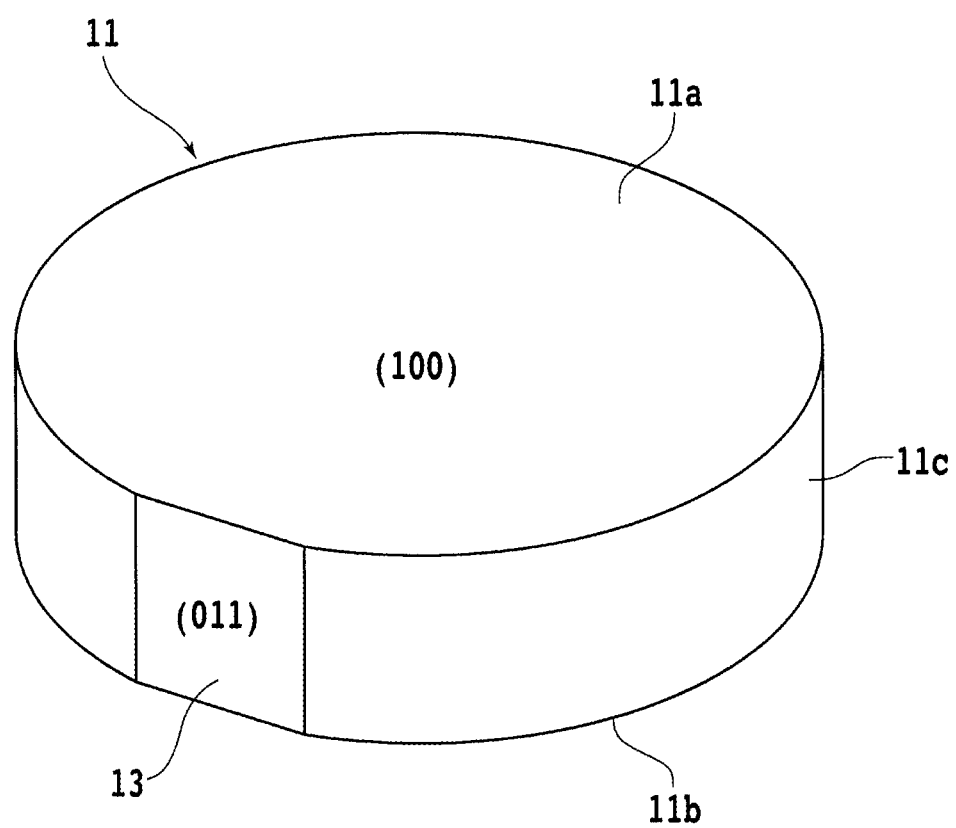
FIG. 1 is a perspective view schematically depicting an example of an ingot.
Figure 2:
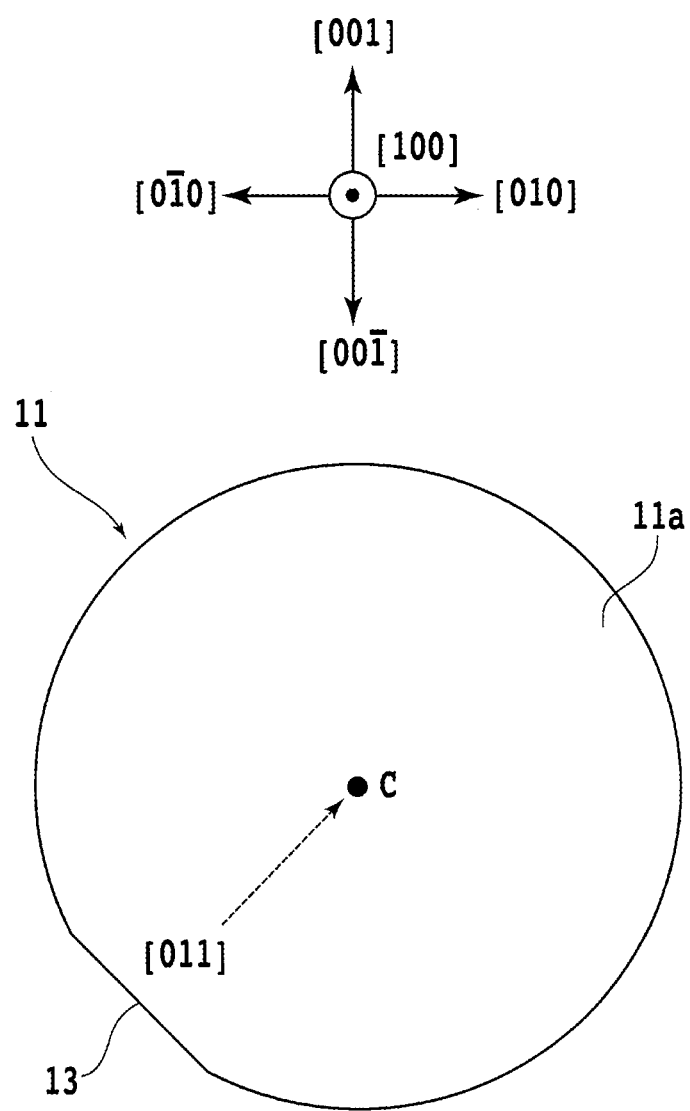
FIG. 2 is a top view schematically depicting the example of the ingot.

An embodiment of the present invention will be described with reference to the accompanying drawings. FIG. 1 is a perspective view schematically depicting an example of a cylindrical ingot formed of single crystal silicon. FIG. 2 is a top view schematically depicting the example of the ingot. Incidentally, FIG. 1 also depicts crystal planes of the single crystal silicon which crystal planes are exposed on flat surfaces included in the ingot. In addition, FIG. 2 also depicts crystal orientations of the single crystal silicon constituting the ingot.

In an ingot 11 depicted in FIG. 1 and FIG. 2, a specific crystal plane (suppose here that the specific crystal plane is a crystal plane (100), for convenience) included in crystal planes {100} is exposed on each of a circular top surface (first surface) 11a and a circular undersurface (second surface) 11b. That is, in the ingot 11, a normal (crystal axis) to each of the top surface 11a and the undersurface 11b is along a crystal orientation [100].

Incidentally, although the ingot 11 is manufactured such that the crystal plane (100) is exposed on each of the top surface 11a and the undersurface 11b, a plane slightly tilted from the crystal plane (100) due to a processing error or the like at a time of manufacturing may be exposed on each of the top surface 11a and the undersurface 11b. Specifically, a plane forming an angle of 1° or less with the crystal plane (100) may be exposed on each of the top surface 11a and the undersurface 11b of the ingot 11. That is, the crystal axis of the ingot 11 may be along a direction forming an angle of 1° or less with the crystal orientation [100].

In addition, an orientation flat 13 is formed on a side surface 11c of the ingot 11. A center C of the ingot 11 is located in a specific crystal orientation (suppose here that the specific crystal orientation is a crystal orientation [011], for convenience) included in crystal orientations <110> as viewed from the orientation flat 13. That is, a crystal plane (011) of the single crystal silicon is exposed at the orientation flat 13.

Figure 3:
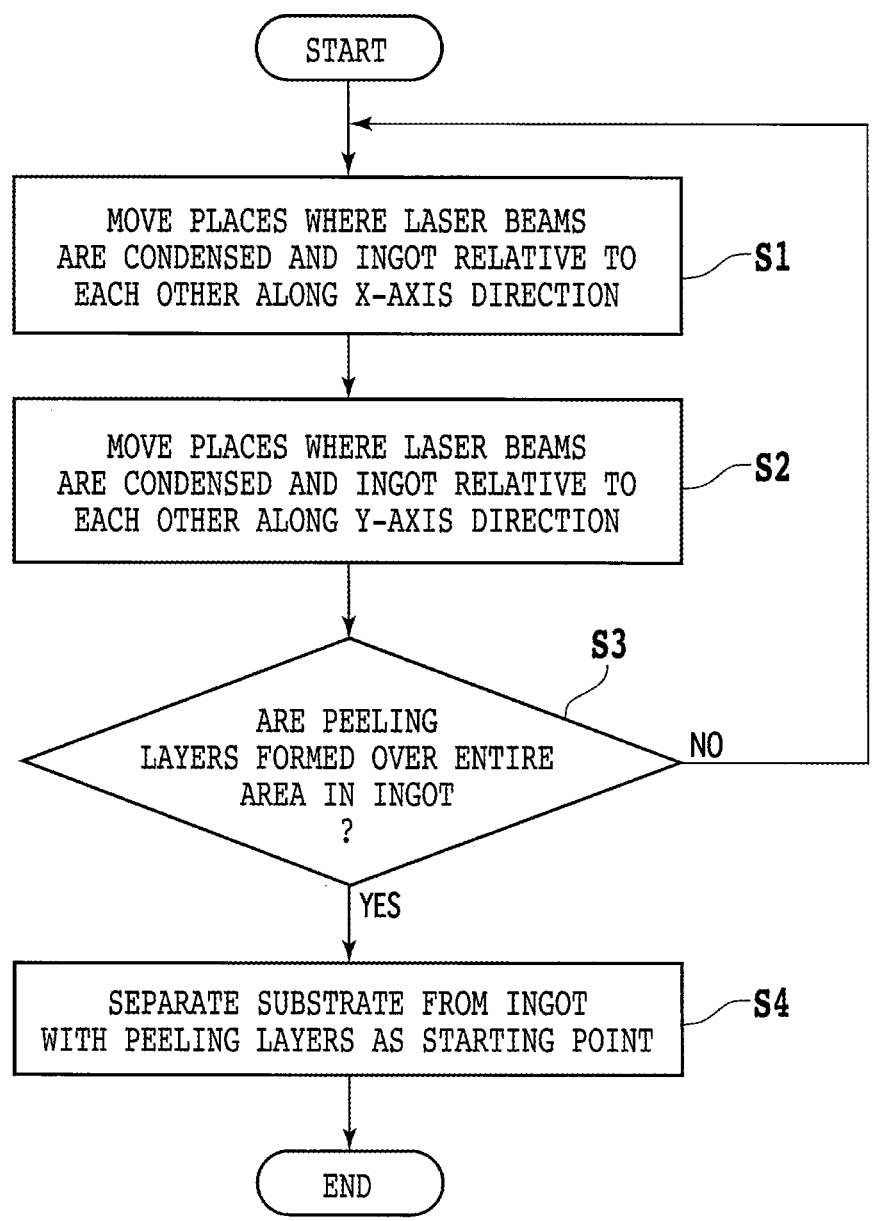
FIG. 3 is a flowchart schematically depicting an example of a substrate manufacturing method.

FIG. 3 is a flowchart schematically depicting an example of a substrate manufacturing method for manufacturing a substrate from the ingot 11 as a workpiece. In short, this method forms a peeling layer in the ingot 11 by using a laser processing apparatus, and thereafter separates the substrate from the ingot 11 with the peeling layer as a starting point.

Figure 4:
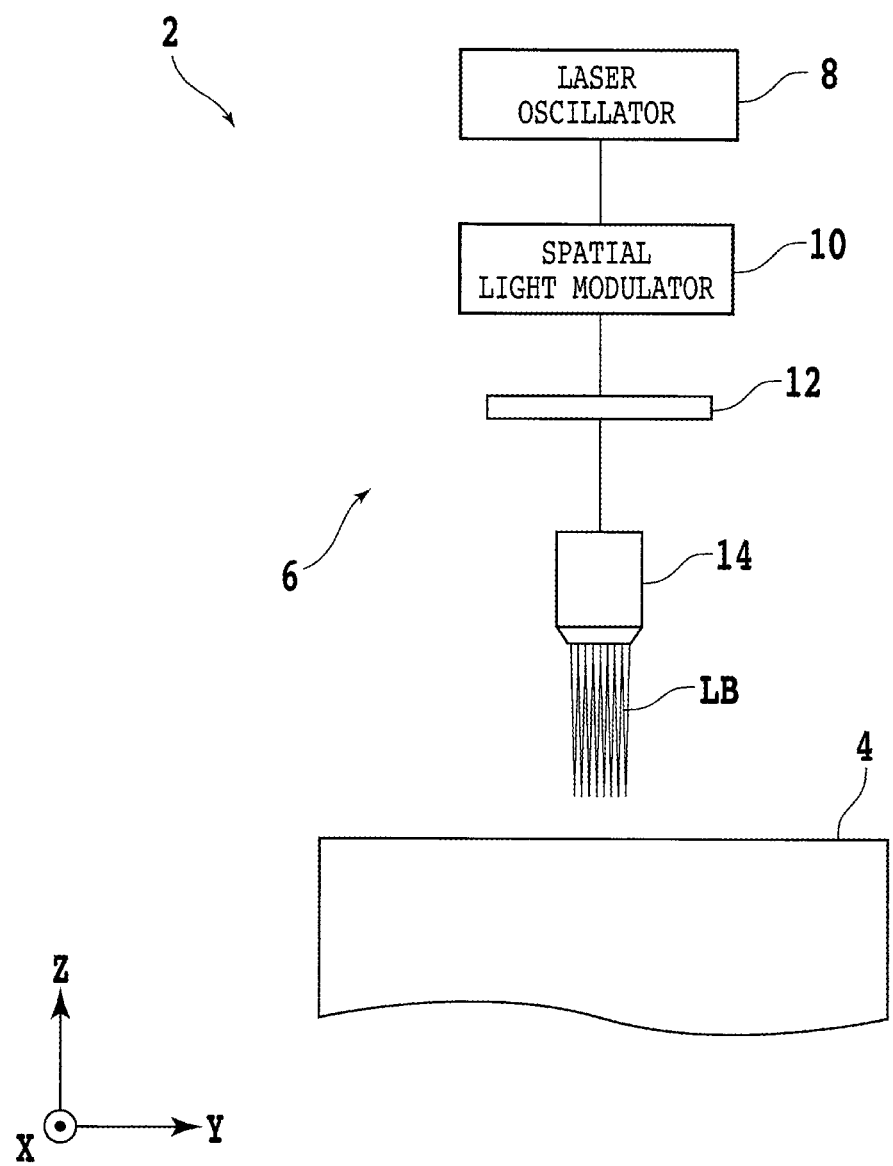
FIG. 4 is a diagram schematically depicting an example of a laser processing apparatus.

FIG. 4 is a diagram schematically depicting an example of a laser processing apparatus used to form a peeling layer in the ingot 11. Incidentally, an X-axis direction (processing feed direction) and a Y-axis direction (indexing feed direction) depicted in FIG. 4 are directions orthogonal to each other on a horizontal plane, and a Z-axis direction is a direction orthogonal to each of the X-axis direction and the Y-axis direction (vertical direction). In addition, in FIG. 4, some of constituent elements of the laser processing apparatus are depicted as functional blocks.

The laser processing apparatus 2 depicted in FIG. 4 includes a cylindrical holding table 4. The holding table 4 has a circular upper surface (holding surface) larger than the top surface 11a and the undersurface 11b of the ingot 11. The holding table 4 holds the ingot 11 on the holding surface. In addition, a cylindrical porous plate (not depicted) is exposed on the holding surface.

Further, this porous plate communicates with a suction source (not depicted) such as an ejector via a flow passage or the like provided in the holding table 4. When the suction source is operated, a negative pressure occurs in a space in the vicinity of the holding surface of the holding table 4. Consequently, for example, the ingot 11 placed on the holding surface can be held by the holding table 4.

In addition, a laser beam irradiating unit 6 is provided above the holding table 4. This laser beam irradiating unit 6 includes a laser oscillator 8. This laser oscillator 8 has, for example, neodymium-doped yttrium aluminum garnet (Nd:YAG) or the like as a laser medium, and applies a pulsed laser beam LB having a wavelength (for example, 1064 nm) that is transmitted through a material (single crystal silicon) constituting the ingot 11.

This laser beam LB enters a spatial light modulator 10 including a liquid crystal phase control element generally referred to as a liquid crystal on silicon (LCoS). Then, in the spatial light modulator 10, the laser beam LB that has entered the spatial light modulator 10 is branched so as to form a plurality of laser beams LB separated from each other in the Y-axis direction.

Further, in the spatial light modulator 10, the wave front of the laser beam LB is controlled such that a length along the Y-axis direction of a place where each branched laser beam LB is condensed is larger than a length along the X-axis direction of the place.

Figure 5A:
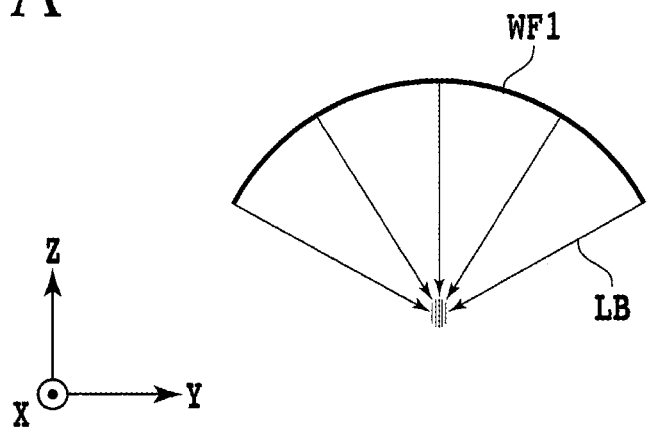
FIG. 5A is a diagram schematically depicting a wave front of a laser beam not controlled in a spatial light modulator and a place where the laser beam is condensed.

FIG. 5A is a diagram schematically depicting a wave front of the laser beam LB not controlled in the spatial light modulator 10 and a place where the laser beam LB is condensed. In addition, each of FIG. 5B and FIG. 5C is a diagram schematically depicting a wave front of the laser beam LB controlled in the spatial light modulator 10 and a place where the laser beam LB is condensed.

Figure 5B:
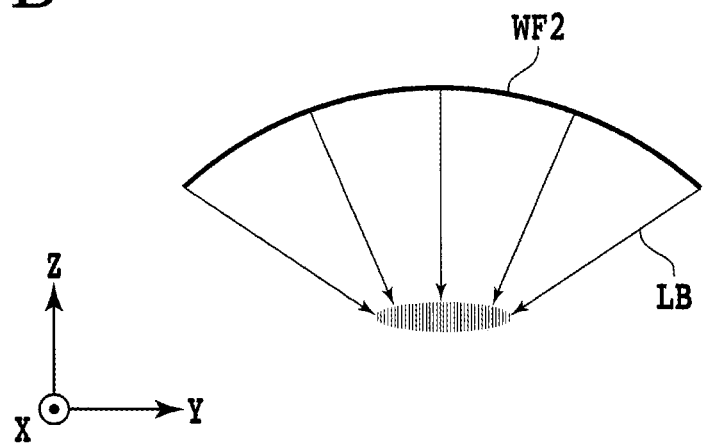
FIG. 5B is a diagram schematically depicting another wave front of the laser beam controlled in the spatial light modulator and another place where the laser beam is condensed.
Figure 5C:
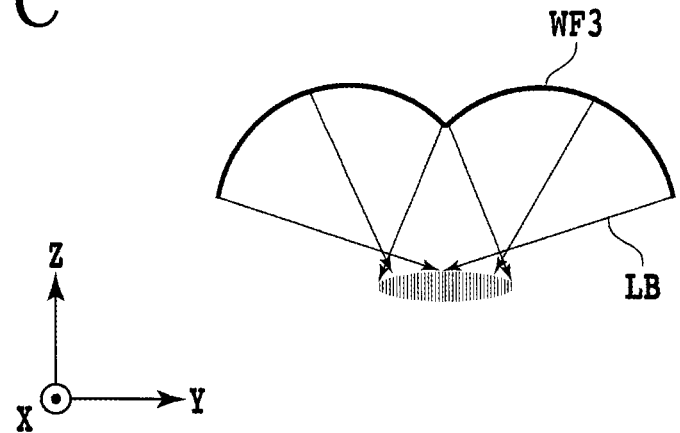
FIG. 5C is a diagram schematically depicting another wave front of the laser beam controlled in the spatial light modulator and another place where the laser beam is condensed.

The spatial light modulator 10, for example, controls the wave front of the laser beam LB so as to achieve a wave front WF2 depicted in FIG. 5B or a wave front WF3 depicted in FIG. 5C, the wave front WF2 or the wave front WF3 having a larger length along the Y-axis direction than a wave front WF1 depicted in FIG. 5A. In this case, when the ingot 11 is irradiated with the laser beam LB, cracks included in the peeling layer formed in the ingot 11 extend along the Y-axis direction easily. It is thereby possible to increase a relative moving distance (index) between the place where the laser beam LB is condensed and the ingot 11 in an indexing feed step (S2) to be described later.

Further, in a case where the wave front of the laser beam LB is the wave front WF3 depicted in FIG. 5C, light rays located on a central side in the Y-axis direction in light rays constituting the laser beam LB are condensed to both end sides, and light rays located on both end sides are condensed to the central side. In this case, a probability that the laser beam LB is condensed at a plurality of regions separated from each other in the Z-axis direction due to an effect of astigmatism is reduced. It is thereby possible to suppress an increase in thickness (length along the Z-axis direction) of the peeling layer formed in the ingot 11 by irradiating the ingot 11 with the laser beam LB, and thus improve the productivity of the substrate.

Incidentally, the laser beam LB whose wave front is controlled in the spatial light modulator 10 may be reflected by a mirror 12 to be described later or the like and then condensed before being applied to the ingot 11. In such a case, the wave front of the laser beam LB may be controlled in the spatial light modulator 10 so as to achieve the wave front WF3 depicted in FIG. 5C after the laser beam LB is reflected.

That is, the spatial light modulator 10 may control the wave front of the laser beam LB such that light rays located on the central side in a direction corresponding to the Y-axis direction (a direction that parallel to the Y-axis direction after the laser beam LB is reflected) are condensed to both end sides in the Y-axis direction and such that light rays located on both end sides are condensed to the central side in the Y-axis direction.

Then, the laser beam LB whose wave front is controlled in the spatial light modulator 10 is reflected by the mirror 12, and is guided to an irradiation head 14. This irradiation head 14 houses a condensing lens (not depicted) or the like that condenses the laser beam LB. Then, the laser beam LB condensed by the condensing lens is applied to the holding surface side of the holding table 4.

Further, the irradiation head 14 of the laser beam irradiating unit 6 is connected to a moving mechanism (not depicted). The moving mechanism, for example, includes a ball screw and the like, and moves the irradiation head 14 along the X-axis direction, the Y-axis direction, and/or the Z-axis direction. In the laser processing apparatus 2, a position (coordinates) in the X-axis direction, the Y-axis direction, and the Z-axis direction of the place where the laser beam LB applied from the irradiation head 14 is condensed is adjusted by operating the moving mechanism.

Figure 6:
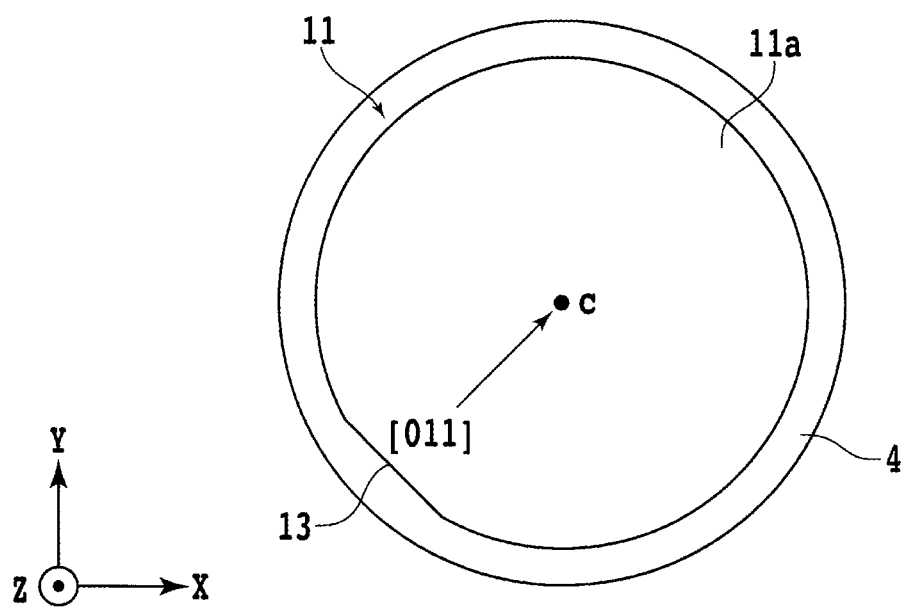
FIG. 6 is a top view schematically depicting a holding table that holds the ingot.

Then, when a peeling layer is to be formed in an entire area in the ingot 11 in the laser processing apparatus 2, first, the holding table 4 holds the ingot 11 in a state in which the top surface 11a is oriented upward. FIG. 6 is a top view schematically depicting the holding table 4 holding the ingot 11.

The ingot 11 is, for example, held on the holding table 4 in a state in which an angle that a direction from the orientation flat 13 to the center C of the ingot 11 (crystal orientation [011]) forms with respect to each of the X-axis direction and the Y-axis direction is 45°. That is, the ingot 11 is, for example, held on the holding table 4 in a state in which a crystal orientation [010] is parallel with the X-axis direction and a crystal orientation [001] is parallel with the Y-axis direction.

Next, a peeling layer is formed in a region on one end side in the Y-axis direction in the ingot 11. Specifically, first, the irradiation head 14 is positioned such that the region is positioned in the X-axis direction as viewed in plan from the irradiation head 14 of the laser beam irradiating unit 6. Next, the irradiation head 14 is raised or lowered such that the place where the laser beam LB applied from the irradiation head 14 is condensed is positioned at a height corresponding to the inside of the ingot 11.

Incidentally, a plurality of laser beams LB branched so as to be separated from each other in the Y-axis direction are applied from the irradiation head 14. Then, the laser beams LB applied from the irradiation head 14 are condensed at a plurality of respective places (for example, eight places) separated from each other in the Y-axis direction. In addition, the length along the Y-axis direction of the places where the branched respective laser beams LB are condensed is larger than the length along the X-axis direction thereof.

Figure 7A:
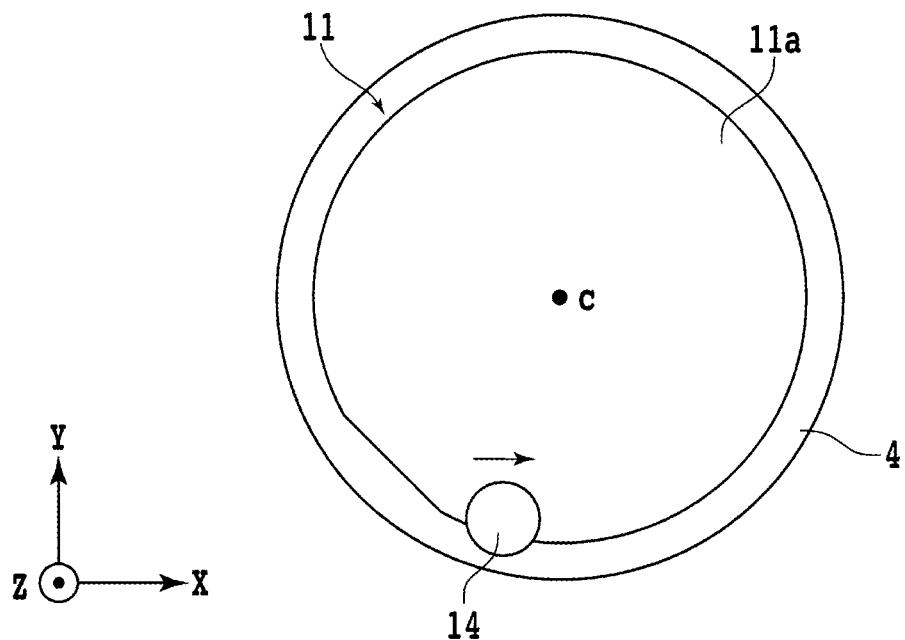
FIG. 7A is a top view schematically depicting a state of an example of a peeling layer forming step.
Figure 7B:
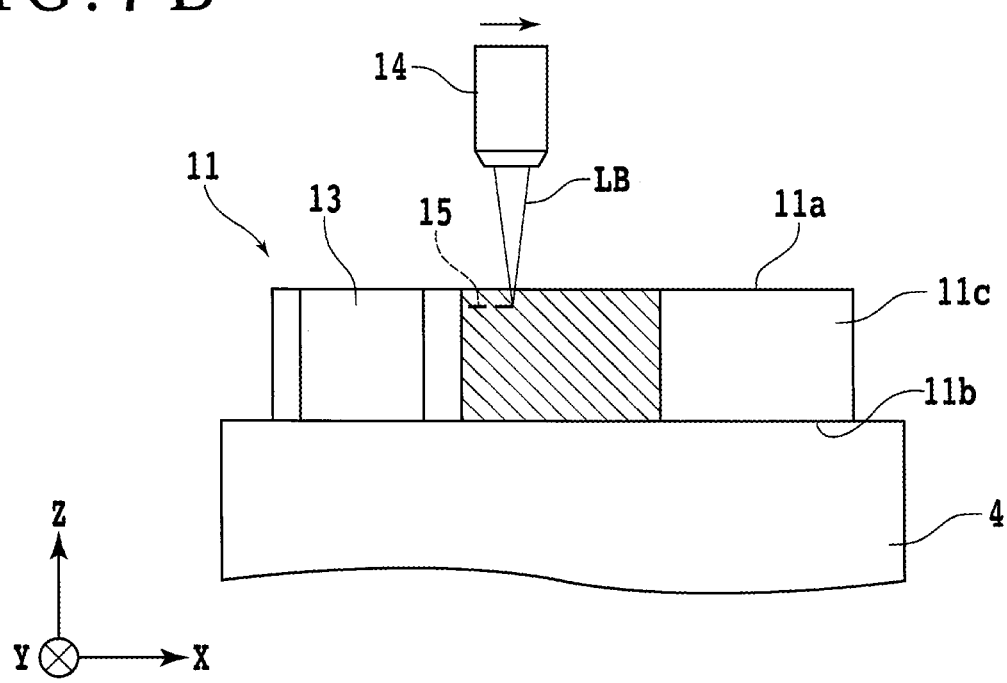
FIG. 7B is a partially sectional side view schematically depicting the state of the example of the peeling layer forming step.
Figure 8:
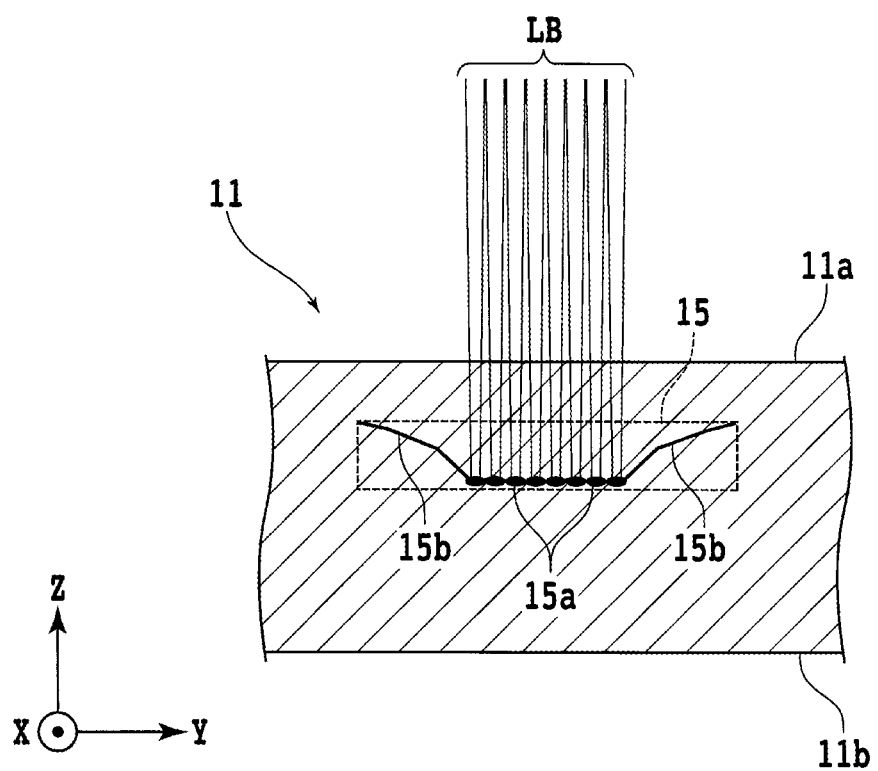
FIG. 8 is a sectional view schematically depicting an example of a peeling layer formed in the ingot in the peeling layer forming step.

Next, a peeling layer is formed by moving the places where the laser beams LB are condensed and the ingot 11 relative to each other along the X-axis direction (peeling layer forming step: S1). FIG. 7A is a top view schematically depicting a state of an example of the peeling layer forming step (S1). FIG. 7B is a partially sectional side view schematically depicting the state of the example of the peeling layer forming step (S1). In addition, FIG. 8 is a sectional view schematically depicting the peeling layer formed in the ingot 11 in the peeling layer forming step (S1).

In this peeling layer forming step (S1), the irradiation head 14 is moved so as to pass from one end to the other end in the X-axis direction of the ingot 11 as viewed in plan while each branched laser beam LB is applied from the irradiation head 14 to the holding table 4 (see FIG. 7A and FIG. 7B).

That is, the places where the laser beams LB are condensed and the ingot 11 are moved relative to each other along the X-axis direction in a state in which the places where the laser beams LB are condensed are located in the ingot 11. Consequently, modified portions 15a in which the crystal structure of the single crystal silicon is disturbed are formed around the places where the respective branched laser beams LB are condensed and whose length along the Y-axis direction is larger than the length along the X-axis direction.

Then, when the modified portions 15a are formed in the ingot 11, the volume of the ingot 11 is expanded, and an internal stress occurs in the ingot 11. This internal stress is reduced by cracks 15b extending from the modified portions 15a. As a result, a peeling layer 15 including the plurality of modified portions 15a and the cracks 15b developing from each of the plurality of modified portions 15a is formed in the ingot 11.

Next, the places where the respective branched laser beams LB are condensed and the ingot 11 are moved relative to each other along the Y-axis direction (indexing feed step: S2). Specifically, the irradiation head 14 is moved along the Y-axis direction such that the moving distance (index) of the irradiation head 14 is longer than a width along the Y-axis direction of the peeling layer 15. Next, the above-described peeling layer forming step (S1) is performed again.

As a result, two peeling layers 15 that are separated from each other in the Y-axis direction and are parallel with each other are formed in the ingot 11. Further, the indexing feed step (S2) and the peeling layer forming step (S1) are repeatedly performed until a peeling layer 15 is formed in a region on the other end side in the Y-axis direction in the ingot 11.

That is, the peeling layer forming step (S1) and the indexing feed step (S2) are repeatedly performed alternately so as to form peeling layers 15 from the region on one end side to the region on the other end side (over an entire area) in the Y-axis direction in the ingot 11. Then, after the peeling layers 15 are formed over the entire area in the ingot 11 (step (S3): YES), the substrate is separated from the ingot 11 with the peeling layers 15 as a starting point (separating step: S4).

Figure 9A:
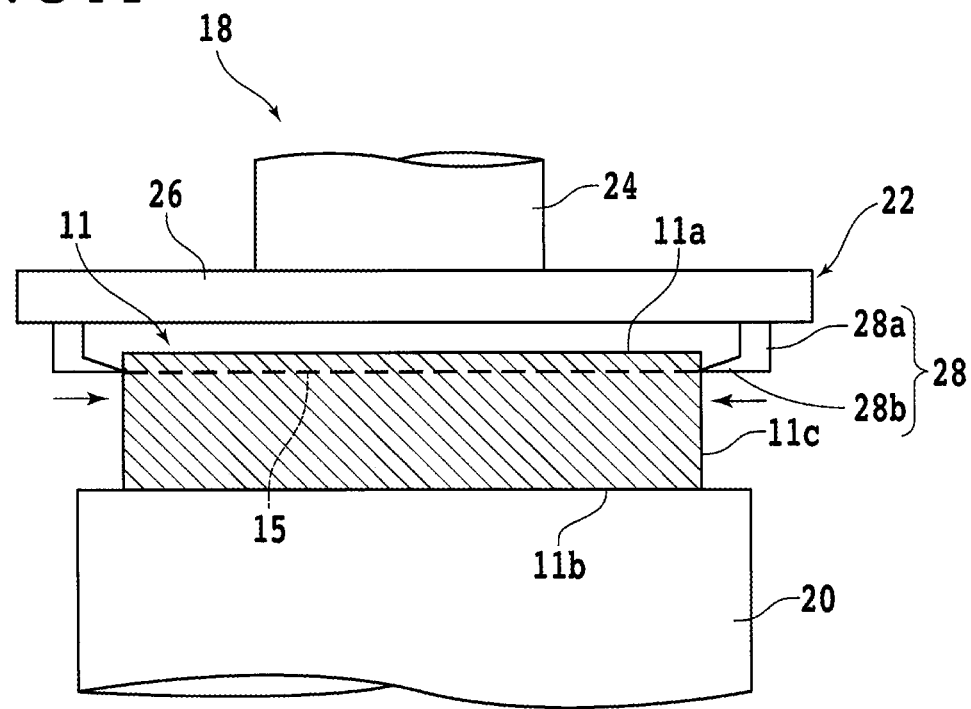
FIG. 9A is a partially sectional side view schematically depicting a state of an example of a separating step.
Figure 9B:
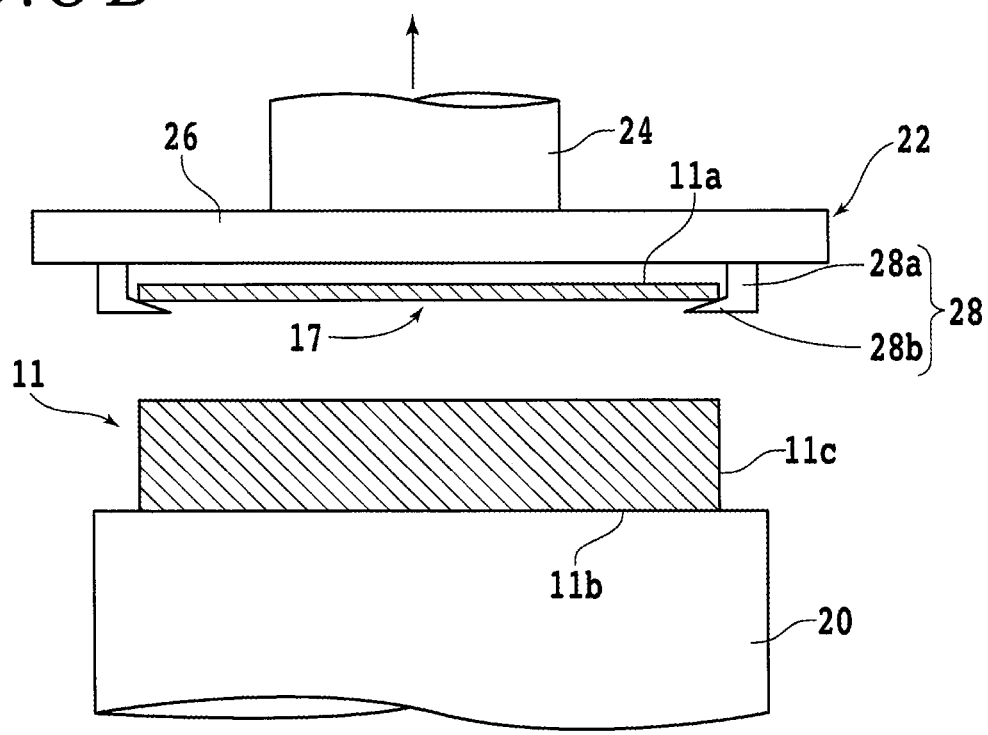
FIG. 9B is a partially sectional side view schematically depicting the state of the example of the separating step of FIG. 9A.

Each of FIG. 9A and FIG. 9B is a partially sectional side view schematically depicting a state of an example of the separating step (S4). The separating step (S4) is, for example, performed in a separating apparatus 18 depicted in FIG. 9A and FIG. 9B. The separating apparatus 18 includes a holding table 20 that holds the ingot 11 in which the peeling layers 15 are formed.

The holding table 20 has a circular upper surface (holding surface). A porous plate (not depicted) is exposed on the holding surface. Further, the porous plate communicates with a suction source (not depicted) such as a vacuum pump via a flow passage or the like provided in the holding table 20. When the suction source is operated, a negative pressure occurs in a space in the vicinity of the holding surface of the holding table 20.

In addition, a separating unit 22 is provided above the holding table 20. The separating unit 22 has a cylindrical supporting member 24. A ball screw type raising and lowering mechanism (not depicted) and a rotational driving source such as a motor, for example, are connected to an upper portion of the supporting member 24. The separating unit 22 is raised or lowered by operating the raising and lowering mechanism. In addition, the supporting member 24 is rotated approximately a straight line as a rotational axis which straight line passes through the center of the supporting member 24 and is along a direction perpendicular to the holding surface of the holding table 20, by operating the rotational driving source.

In addition, a lower end portion of the supporting member 24 is fixed to the center of an upper portion of a disk-shaped base 26. A plurality of movable members 28 are provided to the lower side of a peripheral region of the base 26 at substantially equal intervals along the circumferential direction of the base 26. The movable members 28 each include a plate-shaped erected portion 28a extending downward from the lower surface of the base 26.

Upper end portions of the erected portions 28a are connected to an actuator such as an air cylinder included in the base 26. The movable members 28 are moved along the radial direction of the base 26 by operating the actuator. In addition, the inner surfaces of lower end portions of the erected portions 28a are each provided with a plate-shaped wedge portion 28b that extends toward the center of the base 26 and whose thickness is decreased toward a distal end thereof.

In the separating apparatus 18, the separating step (S4) is performed in the following order, for example. Specifically, first, the ingot 11 is placed on the holding table 20 such that the center of the undersurface 11b of the ingot 11 in which the peeling layers 15 are formed and the center of the holding surface of the holding table 20 coincide with each other.

Next, the suction source communicating with the porous plate exposed on the holding surface is operated such that the ingot 11 is held by the holding table 20. Next, the actuator is operated to position each of the plurality of movable members 28 on the outside in a radial direction of the base 26.

Next, the raising and lowering mechanism is operated to position the distal end of the wedge portion 28b of each of the plurality of movable members 28 at a height corresponding to the peeling layers 15 formed in the ingot 11. Next, the actuator is operated to drive the wedge portions 28b into the side surface 11c of the ingot 11 (see FIG. 9A). Next, the rotational driving source is operated to rotate the wedge portions 28b driven into the side surface 11c of the ingot 11.

Next, the raising and lowering mechanism is operated to raise the wedge portions 28b (see FIG. 9B). After the wedge portions 28b are driven into the side surface 11c of the ingot 11 and rotated as described above, the wedge portions 28b are raised. The cracks 15b included in the peeling layers 15 thereby further extend. As a result, the top surface 11a side and the undersurface 11b side of the ingot 11 are separated from each other. That is, a substrate 17 is manufactured from the ingot 11 with the peeling layers 15 as a starting point.

Incidentally, the wedge portions 28b do not need to be rotated when the top surface 11a side and the undersurface 11b side of the ingot 11 are separated from each other at a time point that the wedge portions 28b are driven into the side surface 11c of the ingot 11. In addition, the wedge portions 28b in a rotating state may be driven into the side surface 11c of the ingot 11 by operating the actuator and the rotational driving source at the same time.

The substrate manufacturing method described above forms the peeling layers 15 in the ingot 11 in a state in which the laser beams LB are condensed such that the length thereof along the Y-axis direction is larger than the length thereof along the X-axis direction. In this case, the cracks 15b included in the peeling layers 15 extend along the Y-axis direction easily.

It is therefore possible to increase the relative moving distance (index) between the places where the laser beams LB are condensed and the ingot 11 in the indexing feed step (S2). As a result, it is possible to improve the throughput of the method of manufacturing the substrate 17 by using the laser beams LB.

Further, the substrate manufacturing method described above forms the peeling layers 15 by moving the places where the plurality of laser beams LB separated from each other in the Y-axis direction (crystal orientation [001]) are respectively condensed and the ingot 11 relative to each other along the X-axis direction (crystal orientation [010]). In this case, an amount of raw material discarded when the substrate 17 is manufactured from the ingot 11 can be reduced, and therefore the productivity of the substrate 17 can be improved.

This point will be described in detail in the following. First, in general, single crystal silicon cleaves most easily in a specific crystal plane included in crystal planes {111}, and cleaves second most easily in a specific crystal plane included in crystal planes {110}. Therefore, when the modified portions are formed along a specific crystal orientation (for example, a crystal orientation [011]) included in crystal orientations <110> of the single crystal silicon constituting the ingot 11, for example, many cracks occur which extend from the modified portions along the specific crystal plane included in the crystal planes {111}.

On the other hand, when a plurality of modified portions are formed in a region along a specific crystal orientation included in crystal orientations <100> of the single crystal silicon so as to be arranged along a direction orthogonal to a direction in which the region extends as viewed in plan, many cracks occur which extend from each of the plurality of modified portions along a crystal plane parallel with the direction in which the region extends among crystal planes {N10} (N is a natural number equal to or less than 10).

For example, when a plurality of modified portions 15a are formed in a region along the crystal orientation [010] so as to be arranged along the crystal orientation [001] as in the substrate manufacturing method described above, cracks are increased which extend from each of the plurality of modified portions 15a along a crystal plane parallel with the crystal orientation [010] among the crystal planes {N10} (N is a natural number equal to or less than 10).

Specifically, when a plurality of modified portions 15a are thus formed, cracks tend to extend in the following crystal planes.

$$(101),(201),(301),(401),(501),(601),(701),(801),(901),(10\underline{0}1)$$ [Expression 1]

$$(\bar{1}01),(\bar{2}01),(\bar{3}01),(\bar{4}01),(\bar{5}01),(\bar{6}01),(\bar{7}01),(\bar{8}01),(\bar{9}01),(\bar{10}01)$$ [Expression 2]

Then, an angle that the crystal plane (100) exposed on the top surface 11a and the undersurface 11b of the ingot 11 forms with respect to a crystal plane parallel with the crystal orientation [010] among the crystal planes {N10} is equal to or less than 45°. On the other hand, an angle that the crystal plane (100) forms with respect to the specific crystal plane included in the crystal planes {111} is approximately 54.7°.

Therefore, in the substrate manufacturing method described above, the peeling layers 15 tend to be wide and thin as compared with a case where a plurality of modified portions are formed in a region along the crystal orientation [011] of the single crystal silicon so as to be arranged along a direction orthogonal to a direction in which this region extends, as viewed in plan. As a result, the substrate manufacturing method described above can reduce an amount of raw material discarded when the substrate 17 is manufactured from the ingot 11 and therefore improve the productivity of the substrate 17.

It is to be noted that the substrate manufacturing method described above is one aspect of the present invention, and that the present invention is not limited to the method described above. For example, the ingot used to manufacture the substrate in the present invention is not limited to the ingot 11 depicted in FIG. 1 and FIG. 2 or the like. Specifically, in the present invention, a substrate may be manufactured from an ingot formed of single crystal silicon in which a crystal plane not included in the crystal planes {100} is exposed on each of the top surface and the undersurface.

In addition, in the present invention, a substrate may be manufactured from a cylindrical ingot having a notch formed in a side surface thereof. Alternatively, in the present invention, a substrate may be manufactured from a cylindrical ingot having neither of an orientation flat nor a notch formed in a side surface thereof. In addition, in the present invention, a substrate may be manufactured from a cylindrical ingot formed of a semiconductor material other than silicon such as silicon carbide.

In addition, the structure of the laser processing apparatus used in the present invention is not limited to the structure of the laser processing apparatus 2 described above. For example, the present invention may be carried out by use of a laser processing apparatus provided with a moving mechanism that moves the holding table 4 along each of the X-axis direction, the Y-axis direction, and/or the Z-axis direction.

That is, in the present invention, it suffices for the holding table 4 holding the ingot 11 and the irradiation head 14 of the laser beam irradiating unit 6 that applies the laser beams LB to be able to move relative to each other along each of the X-axis direction, the Y-axis direction, and the Z-axis direction, and there is no limitation on the structure for the relative movement.

In addition, in the present invention, after the peeling layers 15 are formed from the region on one end side to the region on the other end side (over the entire area) in the Y-axis direction in the ingot 11 (step S3: YES), the peeling layer forming step (S1) and the indexing feed step (S2) may repeatedly be performed again. That is, the laser beams LB may be applied again so as to form peeling layers 15 from the region on one end side to the region on the other end side in the Y-axis direction in the ingot 11 in which the peeling layers 15 are already formed.

In addition, in the present invention, the peeling layer forming step (S1) may be performed again after the peeling layer forming step (S1) and before the indexing feed step (S2). That is, the laser beams LB may be applied again so as to form peeling layers 15 in a linear region in the ingot 11 in which the peeling layers 15 are already formed.

In a case where the peeling layer forming step (S1) is thus performed again for the region in which the peeling layers 15 are already formed, the respective densities of the modified portions 15a and the cracks 15b included in the already formed peeling layers 15 are increased. This facilitates the separation of the substrate 17 from the ingot 11 in the separating step (S4).

Further, in this case, the cracks 15b included in the peeling layers 15 further extend, and thus the length (width) along the Y-axis direction of the peeling layers 15 is increased. Therefore, in this case, it is possible to lengthen the moving distance (index) of the irradiation head 14 of the laser beam irradiating unit 6 in the indexing feed step (S2).

In addition, in the present invention, in a case where the cracks 15b included in the peeling layers 15 can be extended in the separating step (S4), the peeling layers 15 do not have to be formed over the entire area in the ingot 11 in the peeling layer forming step (S2). For example, in a case where the cracks 15b can be extended in a region in the vicinity of the side surface 11c of the ingot 11 by performing the separating step (S4) by use of the separating apparatus 18, peeling layers 15 do not have to be formed in a part or the whole of the region in the vicinity of the side surface 11c of the ingot 11 in the peeling layer forming step (S2).

Figure 10A:
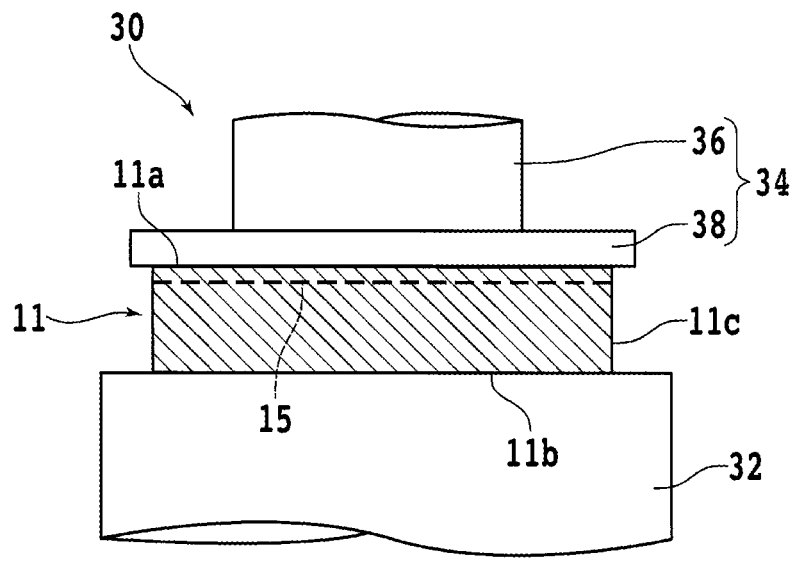
FIG. 10A is a partially sectional side view schematically depicting another example of the separating step.
Figure 10B:
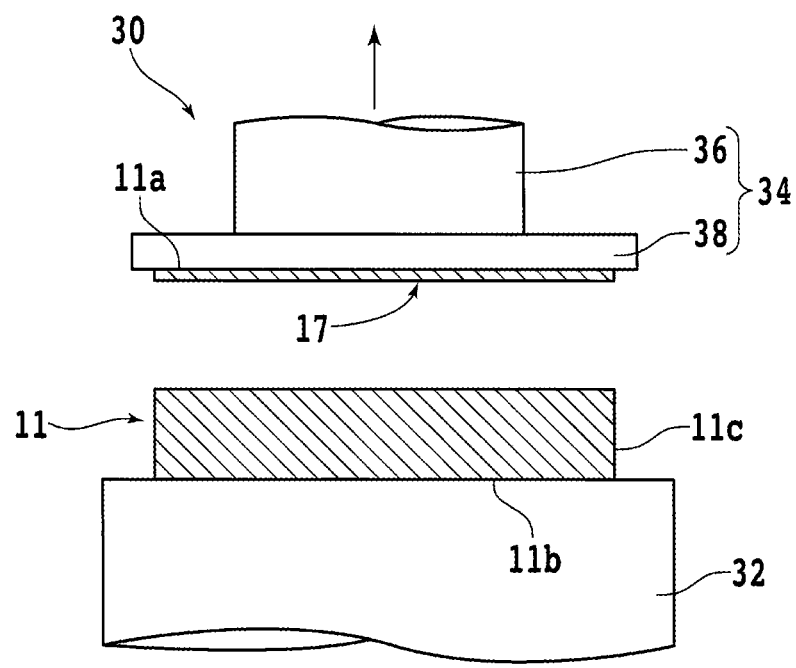
FIG. 10B is a partially sectional side view schematically depicting the other example of the separating step of FIG. 10A.

In addition, the separating step (S4) of the present invention may be performed by use of an apparatus other than the separating apparatus 18 depicted in FIG. 9A and FIG. 9B. FIG. 10A and FIG. 10B are partially sectional side views schematically depicting an example of the separating step (S4) performed by use of an apparatus other than the separating apparatus 18.

A separating apparatus 30 depicted in FIG. 10A and FIG. 10B includes a holding table 32 that holds the ingot 11 in which the peeling layers 15 are formed. The holding table 32 has a circular upper surface (holding surface). A porous plate (not depicted) is exposed on the holding surface.

Further, the porous plate communicates with a suction source (not depicted) such as a vacuum pump via a flow passage or the like provided in the holding table 32. Therefore, when the suction source is operated, a negative pressure occurs in a space in the vicinity of the holding surface of the holding table 32.

In addition, a separating unit 34 is provided above the holding table 32. The separating unit 34 has a cylindrical supporting member 36. A ball screw type raising and lowering mechanism (not depicted), for example, is connected to an upper portion of the supporting member 36. The separating unit 34 is raised or lowered by operating the raising and lowering mechanism.

In addition, a lower end portion of the supporting member 36 is fixed to the center of an upper portion of a disk-shaped suction plate 38. A plurality of suction ports are formed in the lower surface of the suction plate 38. Each of the plurality of suction ports communicates with a suction source (not depicted) such as a vacuum pump via a flow passage or the like provided in the suction plate 38. Therefore, when the suction source is operated, a negative pressure occurs in a space in the vicinity of the lower surface of the suction plate 38.

In the separating apparatus 30, the separating step (S4) is performed in the following order, for example. Specifically, first, the ingot 11 is placed on the holding table 32 such that the center of the undersurface 11b of the ingot 11 in which the peeling layers 15 are formed and the center of the holding surface of the holding table 32 coincide with each other.

Next, the suction source communicating with the porous plate exposed on the holding surface is operated such that the ingot 11 is held by the holding table 32. Next, the separating unit 34 is lowered by operating the raising and lowering mechanism such that the lower surface of the suction plate 38 comes into contact with the top surface 11a of the ingot 11.

Next, the suction source communicating with the plurality of suction ports is operated such that the top surface 11a side of the ingot 11 is sucked via the plurality of suction ports formed in the suction plate 38 (see FIG. 10A). Next, the separating unit 34 is raised by operating the raising and lowering mechanism such that the suction plate 38 is separated from the holding table 32 (see FIG. 10B).

At this time, an upward force acts on the top surface 11a side of the ingot 11 which top surface 11a side is sucked via the plurality of suction ports formed in the suction plate 38. As a result, the cracks 15b included in the peeling layers 15 further extend, and the top surface 11a side and the undersurface 11b side of the ingot 11 are separated from each other. That is, a substrate 17 is manufactured from the ingot 11 with the peeling layers 15 as a starting point.

In addition, in the separating step (S4) of the present invention, prior to the separation of the top surface 11a side and the undersurface 11b side of the ingot 11 from each other, an ultrasonic wave may be applied to the top surface 11a side of the ingot 11. In this case, the cracks 15b included in the peeling layers 15 further extend, which facilitates the separation of the top surface 11a side and the undersurface 11b side of the ingot 11 from each other.

In addition, in the present invention, the top surface 11a of the ingot 11 may be planarized by grinding or polishing before the peeling layer forming step (S1) (planarizing step). This planarization may, for example, be performed when a plurality of substrates are manufactured from the ingot 11. Specifically, when the substrate 17 is manufactured through the separation of the top surface 11a side and the undersurface 11b side of the ingot 11 from each other at the peeling layers 15, unevenness reflecting the distribution of the modified portions 15a and the cracks 15b included in the peeling layers 15 is formed on a newly exposed top surface of the ingot 11.

Therefore, when a new substrate is to be manufactured from the ingot 11, the top surface of the ingot 11 is preferably planarized prior to the peeling layer forming step (S1). It is thereby possible to suppress diffused reflection of the laser beams LB applied to the ingot 11 on the top surface of the ingot 11 in the peeling layer forming step (S1). Similarly, in the present invention, a surface on the peeling layer 15 side of the substrate 17 separated from the ingot 11 may be planarized by grinding or polishing.

In addition, in the present invention, a substrate may be manufactured by use of a bare wafer formed of a semiconductor material such as silicon or silicon carbide as a workpiece. Incidentally, the bare wafer, for example, has a thickness two to five times that of the substrate to be manufactured. In addition, the bare wafer is, for example, manufactured by being separated from an ingot formed of semiconductor material such as silicon or silicon carbide by a method similar to the method described above. In this case, the substrate can also be said to be manufactured by repeating the above-described method twice.

In addition, in the present invention, a substrate may be manufactured by use of, as a workpiece, a device wafer manufactured by forming a semiconductor device on one surface of the bare wafer. Further, structures, methods, and the like according to the foregoing embodiment can be modified and implemented as appropriate without departing from the objective scope of the present invention.

EXAMPLES

Under a plurality of conditions of different shapes of the places where the laser beams LB were condensed, a maximum value of an index at which peeling layers were able to be formed without a gap in a workpiece formed of single crystal silicon having a thickness of 775 μm was investigated. In this investigation, the laser beam LB adjusted so as to have a power of 4.0 W was branched into eight laser beams LB separated from each other in the indexing feed direction (Y-axis direction), and applied to the workpiece.

In addition, the application of the laser beams LB was performed in a state in which each of the branched laser beams LB was condensed in the workpiece. In addition, a relative moving speed (processing feed speed) along the processing feed direction (X-axis direction) between the laser beams LB and the workpiece was set at 360 mm/s.

Table 1 indicates a maximum value of an index at which peeling layers can be formed without a gap in the workpiece in a case (comparative example) in which each of the branched laser beams LB is condensed so as to form a circular shape having a diameter of 1 μm on a plane parallel with the X-axis direction and the Y-axis direction (XY plane), a case (first example) in which each of the branched laser beams LB is condensed so as to form a shape elongated from the circular shape along the Y-axis direction by 1 μm on the XY plane, a case (second example) in which each of the branched laser beams LB is condensed so as to form a shape elongated from the circular shape along the Y-axis direction by 2 μm on the XY plane, and a case (third example) in which each of the branched laser beams LB is condensed so as to form a shape elongated from the circular shape along the Y-axis direction by 3 μm on the XY plane.

Incidentally, in the comparative example and the first example, intervals between the places where the branched laser beams LB were condensed were approximately 12 μm. In addition, in the second example, the intervals between the places where the branched laser beams LB were condensed were 13 to 14 μm. In addition, in the third example, the intervals between the places where the branched laser beams LB were condensed were approximately 13 μm.

TABLE 1

| | COMPARATIVE EXAMPLE | FIRST EXAMPLE | SECOND EXAMPLE | THIRD EXAMPLE |
|---|---|---|---|---|
| INDEX | 550 μm | 590 μm | 610 μm | 590 μm |

As indicated in Table 1, it is clear that the index can be made larger in the first to third examples by approximately one tenth than that in the comparative example.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A substrate manufacturing method for manufacturing a substrate from a workpiece having a first surface and a second surface on an opposite side from the first surface, the substrate manufacturing method comprising:
    a peeling layer forming step of forming a peeling layer by moving (a) a place where a laser beam having a wavelength transmitted through a material constituting the workpiece is condensed and (b) the workpiece relative to each other along a processing feed direction parallel with the first surface in a state in which the laser beam is condensed in the workpiece;
    an indexing feed step of moving (a) the place where the laser beam is condensed and (b) the workpiece relative to each other along an indexing feed direction orthogonal to the processing feed direction and parallel with the first surface by an indexing feed distance; and
    a separating step of separating the substrate from the workpiece with the peeling layer as a starting point after repeating the peeling layer forming step and the indexing feed step alternately,
    wherein, in the peeling layer forming step, the laser beam is condensed so as to have a larger length along the indexing feed direction than a length along the processing feed direction
    wherein, in the peeling layer forming step, the workpiece is irradiated with the laser beam having a wave front controlled by a spatial light modulator,
    light rays located on a central side in a direction corresponding to the indexing feed direction in light rays constituting the laser beam entering the spatial light modulator are condensed to both end sides in the indexing feed direction of the place, and
    light rays located on both end sides in the direction corresponding to the indexing feed direction in the light rays constituting the laser beam entering the spatial light modulator are condensed to a central side in the indexing feed direction of the place.

2. The substrate manufacturing method according to claim 1,
    wherein the laser beam is branched so as to be condensed at each of a plurality of places separated from each other in the indexing feed direction.

3. The substrate manufacturing method according to claim 2, wherein the indexing feed distance is longer than a width along the indexing feed direction of the peeling layer.

4. The substrate manufacturing method according to claim 2, wherein during the peeling layer forming step, the laser beam is condensed so as to form a shape elongated from a circular shape along the indexing feed direction by 2 μm on a plane defined by the processing feed direction and the indexing feed direction and
    wherein the intervals between the places where the branched laser beams are condensed is 13 to 14 μm.

5. The substrate manufacturing method according to claim 1, wherein the spatial light modulator comprises a liquid crystal on silicon.

6. The substrate manufacturing method according to claim 1, wherein when the workpiece is irradiated with the laser beam, cracks included in the peeling layer formed in the workpiece extend along the indexing feed direction, thereby making it possible to increase a relative moving distance between the place where the laser beam is condensed and the workpiece in the indexing feed direction.

7. The substrate manufacturing method according to claim 1, wherein the workpiece comprises single crystal silicon.

8. The substrate manufacturing method according to claim 1, wherein the workpiece is an ingot having an orientation flat and
    wherein during the peeling layer forming step and the indexing step the ingot is held on a holding table in a state in which an angle that a direction from the orientation flat to a center of the ingot forms with respect to each of the processing feed direction and the indexing feed direction is 45°.

9. The substrate manufacturing method according to claim 1, wherein the workpiece is an ingot having a plurality of crystal orientations and
    wherein during the peeling layer forming step and the indexing step the ingot is held on a holding table in a state in which a first crystal orientation is parallel with the processing feed direction and a second crystal orientation is parallel with the indexing feed direction.

10. The substrate manufacturing method according to claim 1, wherein during the separating step a plurality of movable members are utilized, the movable members being provided to a lower side of a peripheral region of a disk-shaped base at substantially equal intervals along a circumferential direction of the base.

11. The substrate manufacturing method according to claim 10, wherein the movable members comprise wedge portions.

12. The substrate manufacturing method according to claim 1, wherein during the peeling layer forming step, the moving is set at a speed of 360 mm/s.

13. The substrate manufacturing method according to claim 1, wherein during the peeling layer forming step, the laser beam is condensed so as to form a shape elongated from a circular shape along the indexing feed direction by 1 μm on a plane defined by the processing feed direction and the indexing feed direction.

14. The substrate manufacturing method according to claim 1, wherein when the workpiece is irradiated with the laser beam, cracks included in the peeling layer formed in the workpiece extend along the indexing feed direction, thereby making it possible to increase a relative moving distance between the place where the laser beam is condensed and the workpiece in the indexing feed direction.

15. The substrate manufacturing method according to claim 1, wherein the workpiece is an ingot having an orientation flat and
    wherein during the peeling layer forming step and the indexing step the ingot is held on a holding table in a state in which an angle that a direction from the orientation flat to a center of the ingot forms with respect to each of the processing feed direction and the indexing feed direction is 45°.

16. The substrate manufacturing method according to claim 1, wherein the workpiece is an ingot having a plurality of crystal orientations and wherein during the peeling layer forming step and the indexing step the ingot is held on a holding table in a state in which a first crystal orientation is parallel with the processing feed direction and a second crystal orientation is parallel with the indexing feed direction.

\* \* \* \* \*